United States Patent
Ehmann et al.

(10) Patent No.: US 11,437,799 B2
(45) Date of Patent: Sep. 6, 2022

(54) CABLE BUSHING (71) Applicant: ICOTEK PROJECT GMBH & CO. KG, Mogglingen (DE)

(72) Inventors: Bruno Ehmann, Mogglingen (DE); Valentin Ehmann, Schwabisch Gmund (DE)

(73) Assignee: ICOTEK PROJECT GMBH & CO. KG, Mogglingen (DE)

( * ) Notice: Subject to any disclaimer, the term of this patent is extended or adjusted under 35 U.S.C. 154(b) by 0 days.

(21) Appl. No.: 16/614,782

(22) PCT Filed: May 16, 2018

(86) PCT No.: PCT/EP2018/062642
§ 371 (c)(1),
(2) Date: Nov. 18, 2019

(87) PCT Pub. No.: WO2018/210892
PCT Pub. Date: Nov. 22, 2018

(65) Prior Publication Data
US 2020/0176964 A1 Jun. 4, 2020

(30) Foreign Application Priority Data
May 19, 2017 (DE) ...................... 10 2017 208 477.4

(51) Int. Cl.
*H02G 3/22* (2006.01)
*H02G 15/007* (2006.01)
(Continued)

(52) U.S. Cl.
CPC ............... *H02G 3/22* (2013.01); *H02G 3/083* (2013.01); *H02G 3/088* (2013.01); *H02G 15/007* (2013.01); *H02G 15/013* (2013.01)

(58) Field of Classification Search
CPC .................................................. H02G 15/013
See application file for complete search history.

(56) References Cited

U.S. PATENT DOCUMENTS 3,076,655 A * 2/1963 Washburn, Jr. ........ F16J 15/022
277/500
3,424,856 A * 1/1969 Coldren ............... H02G 3/0633
174/153 G
(Continued)

FOREIGN PATENT DOCUMENTS

DE 10143296 6/2002
DE 10347653 5/2005
(Continued)

OTHER PUBLICATIONS

International Search Report and Written Opinion for PCT/EP2018/062642, dated Aug. 20, 2018, 9 pages.
(Continued)

*Primary Examiner* — Paresh Paghadal
(74) *Attorney, Agent, or Firm* — Faegre Drinker Biddle & Reath LLP (57) ABSTRACT

The invention relates to a cable bushing to be screwed together with a wall comprising a passage for at least one prefabricated cable, comprising
two partial elements, which are screwed together with one another in the installed state,
a threaded section, which is formed by the two partial elements in each case in a part of its circumference, and comprises a thread, for feeding through the passage,
a receptacle section adjoining thereon in the axial direction of an axis of rotation of the threaded section, which has a larger external diameter than the threaded section at least in sections, and which
comprises at least one receptacle opening for accommodating at least one strain relief bushing.
The cable bushing according to the invention is characterized in that the division between the two partial elements is formed off-center, so that the circumference of the recep- (Continued)

tacle opening extending around the at least one strain relief bushing is greater in one of the partial elements than in the other of the partial elements.

20 Claims, 4 Drawing Sheets

(51) Int. Cl.
*H02G 15/013* (2006.01)
*H02G 3/08* (2006.01)

(56) References Cited

U.S. PATENT DOCUMENTS

| | | | | |
|---|---|---|---|---|
| 4,002,822 | A * | 1/1977 | Kurosaki | H02G 3/0658 |
| | | | | 174/153 G |
| 4,343,496 | A * | 8/1982 | Petranto | F16L 19/0231 |
| | | | | 285/334.5 |
| 4,547,035 | A * | 10/1985 | Espiritu | H01R 13/5045 |
| | | | | 439/470 |
| 4,963,104 | A * | 10/1990 | Dickie | H01R 9/0524 |
| | | | | 439/460 |
| 6,107,571 | A * | 8/2000 | Damm | H02G 15/113 |
| | | | | 174/72 C |
| 6,118,076 | A * | 9/2000 | Damm | H02G 15/113 |
| | | | | 174/77 R |
| 6,394,464 | B1 | 5/2002 | Moreau | |
| 7,806,374 | B1 * | 10/2010 | Ehmann | H02G 3/22 |
| | | | | 248/67.5 |
| 10,305,269 | B2 | 5/2019 | Naumann et al. | |
| 2002/0191941 | A1 * | 12/2002 | Milanowski | H02G 15/113 |
| | | | | 385/135 |
| 2004/0256138 | A1 * | 12/2004 | Grubish | H02G 3/22 |
| | | | | 174/93 |
| 2010/0001476 | A1 | 1/2010 | Broeder | |
| 2013/0028569 | A1 * | 1/2013 | Kempeneers | H02G 3/22 |
| | | | | 385/139 |
| 2015/0083486 | A1 | 3/2015 | Hill | |

FOREIGN PATENT DOCUMENTS

| | | |
|---|---|---|
| DE | 102015208400 | 11/2016 |
| EP | 0706624 | 1/1997 |
| EP | 2746634 | 6/2014 |
| GB | 2399464 A | 9/2004 |
| JP | 60-062821 U | 5/1985 |
| JP | 2004-247165 A | 9/2004 |
| JP | 2009-519700 A | 5/2009 |
| JP | 2013-230012 A | 11/2013 |
| WO | 2007/073338 A1 | 6/2007 |
| WO | 2013/161532 | 10/2013 |

OTHER PUBLICATIONS

International Preliminary Report on Patentability received for PCT Patent Application No. PCT/EP2018/062642, dated Nov. 28, 2019, 15 pages (9 pages of English Translation and 6 pages of Original Document).

* cited by examiner

CABLE BUSHING

CROSS-REFERENCE TO RELATED APPLICATION

The present application is a National Stage of International Application No. PCT/EP2018/062642, filed May 16, 2018, and which claims priority to DE 10 2017 208 477.4, filed May 19, 2017, the entire disclosures of which are hereby expressly incorporated herein by reference.

The disclosure relates to a cable bushing to be screwed to a wall comprising a passage for at least one cable.

BACKGROUND/SUMMARY

A cable bushing of the type in question is known from DE 101 43 296 A1. The structure of the cable bushing therein is suitable for accommodating so-called prefabricated lines, i.e., lines having already attached plugs or the like. For this purpose, the entire structure of the cable bushing can be divided in the center, so that the cable can be inserted into the cable bushing in the divided state together with a cable bushing, which can be folded open and guided around the cable. Subsequently, the two halves of the cable bushing are connected to one another, in particular clipped to one another. The structure of the cable bushing together with the prefabricated cable may then be guided through a sufficiently large passage, for example, in the wall of a control cabinet, so that the structure can be screwed into the passage by means of a nut and a threaded section of the cable bushing. The described embodiment variant offers a certain level of leak-tightness of the system in this case, in particular against dust and also against moisture in a corresponding leak-tightness class. Moreover, the strain relief bushing, in a double function as a sealing element, on the one hand, and as a receptacle element for the cable for its strain relief, on the other hand, offers mechanical securing of the cable.

A comparable structure for accommodating multiple strain relief bushings with cables, i.e., for feeding through multiple cables, is furthermore known from DE 103 47 653 A1 of the same applicant.

The cable bushings described in the prior art having the center division thereof and the option of clipping the two parts to one another or also screwing them together, as is set forth in each case in the description, offer the option in this case of simple and rapid installation. However, they do not enable an extremely high level of leak-tightness of the system against water and moisture, since the structures are generally only plugged together.

The object of the present disclosure here is therefore to specify a cable bushing according to the preamble of Claim 1, which enables a high level of leak-tightness of the system, and which in particular achieves the protection class IP66 and/or IP 66/67, according to the international norm IEC 60529.

This object is achieved according to the disclosure by a cable bushing having the features in Claim 1. Advantageous embodiments and refinements result from the subclaims dependent thereon.

The cable bushing according to the disclosure provides that the structure consists of two partial elements, comparably as in the prior art in question. However, according to the disclosure, the division is no longer formed in the center, as in the partial elements according to the prior art, but rather off-center, so that the circumference of the receptacle opening extending around the at least one strain relief is greater in one partial element than in the other partial element. Due to this division of the two elements off-center, so that the division thus does not occur in a plane in which the central axis of the threaded section is also located, a very much better arrangement of the division joints of the two partial elements in relation to the strain relief bushing or bushings is enabled. In particular, the division planes are located so that they do not meet one another within the lateral delimitation surface of the strain relief bushings, but rather, as is provided according to one advantageous refinement of the cable bushing, in the region of a corner of the preferably rectangular or square strain relief bushings. In this way, a very much simpler and more efficient seal is enabled than in the structures according to the prior art. A very high level of leak-tightness of the cable bushing according to the disclosure may be achieved in this way, so that the protective classes IP66 and/or IP67 are achievable.

According to one advantageous refinement of the concept, it is provided that the detachable connection between the partial elements is implemented as a screw connection. Due to the screwing together of the partial elements with one another, high clamping forces may be implemented very advantageously, which enable a secure and reliable seal between the strain relief bushings and the cables, on the one hand, and the strain relief bushings and the partial elements, on the other hand. An even better seal of the entire structure is thus to be achieved by these forces, which are significantly higher than they would be in the case of clipping of the partial elements.

The two partial elements, which are divided into the threaded section and the receptacle section for the strain relief bushing or bushings, are constructed in this case according to a very advantageous refinement so that seal elements are introduced at least in the region of the receptacle section between the two partial elements. These seal elements improve the seal still further, so that an even higher and better level of sealing against moisture and liquid can be achieved. The seal can preferably be extruded onto one or both partial elements in this case, in particular if they are produced from plastic or fiber-reinforced plastic, in particular in turn by an injection-molding process.

The thread of the threaded section, according to one extraordinarily advantageous refinement of the cable bushing according to the disclosure, does not extend here over the entire circumference, as is the case in the prior art, but rather only over a part of the circumference. The thread thus comprises one or more gaps over the circumference. This is typically sufficient to screw together the structure solidly, so that omitting the thread in a partial region of the circumference is not critical with respect to the fastening and the sealing. The division of the threaded section can deviate in this case from the division of the receptacle section.

According to one extraordinarily advantageous refinement of the concept, it is provided in this case that the partial element is formed having the smaller part in the region of the threaded section without thread. This enables a very simple and efficient structure. The partial element, which makes up, for example, 70 to 75% of the circumference in the region of the threaded section, bears the conventional thread in this case. The other partial element, which completes the circumference accordingly, does not bear a thread. Because threads of the two partial elements do not have to meet one another, the manufacturing tolerances for the partial elements may be reduced. Possible undesirably large tolerances in the region of the threads then do not result in obstructive or stiff screwing on of the nut, which is a decisive advantage with respect to the installation.

According to one very advantageous refinement of the concept, it is provided for this purpose that threaded bushes made of a metallic material are introduced into the receptacle section of the larger of the two partial elements. Such threaded bushes, which can be screwed in or, according to one advantageous refinement of the concept, embedded in the material of the partial element, for example, enable very simple and efficient installation of the two partial elements in relation to one another by means of the screws used for the screw connection. These can also be detached again easily and screwed together again, since noteworthy wear does not occur in the region of the thread due to the metallic threaded bushes, in contrast to screwing into a thread made of plastic material.

A further advantageous embodiment furthermore provides that at least one of the partial elements comprises protruding guide elements in the region of the division, which engage in corresponding depressions of the respective other partial element. Such guide elements and depressions can be provided in particular in the region of the screws, for example, adjacent to the screws, to enable simple and efficient installation. During the installation, the cable can be laid in the strain relief bushing, which can be folded open via a slot, for example. The one or more folded-closed strain relief bushings having the cable are then inserted into the receptacle opening of the one partial element and are held very well therein because of the friction, which is necessary later for the sealing. They then cannot fall out during the installation, even if the partial element having the inserted strain relief bushings and cables is turned upside down, for example. They thus cannot be lost under the regular conditions of the installation. The worker assigned the installation can then put on the other partial element simply and efficiently. Due to the guide elements and the corresponding openings in the two partial elements, the positioning of the two partial elements both in the receptacle section and also in the threaded section in relation to one another is accordingly possible simply and reliably. The worker can then insert the screws and screw together the two partial elements using the predetermined torque, to thus achieve the sufficient seal, for example, to achieve the above-mentioned protective classes IP66/67 with respect to the leak-tightness of the structure.

Further advantageous embodiments of the cable bushing according to the disclosure also result from the further dependent subclaims and will be clear on the basis of the exemplary embodiments, which are described in greater detail hereafter with reference to the figures.

DETAILED DESCRIPTION

Figure 1:
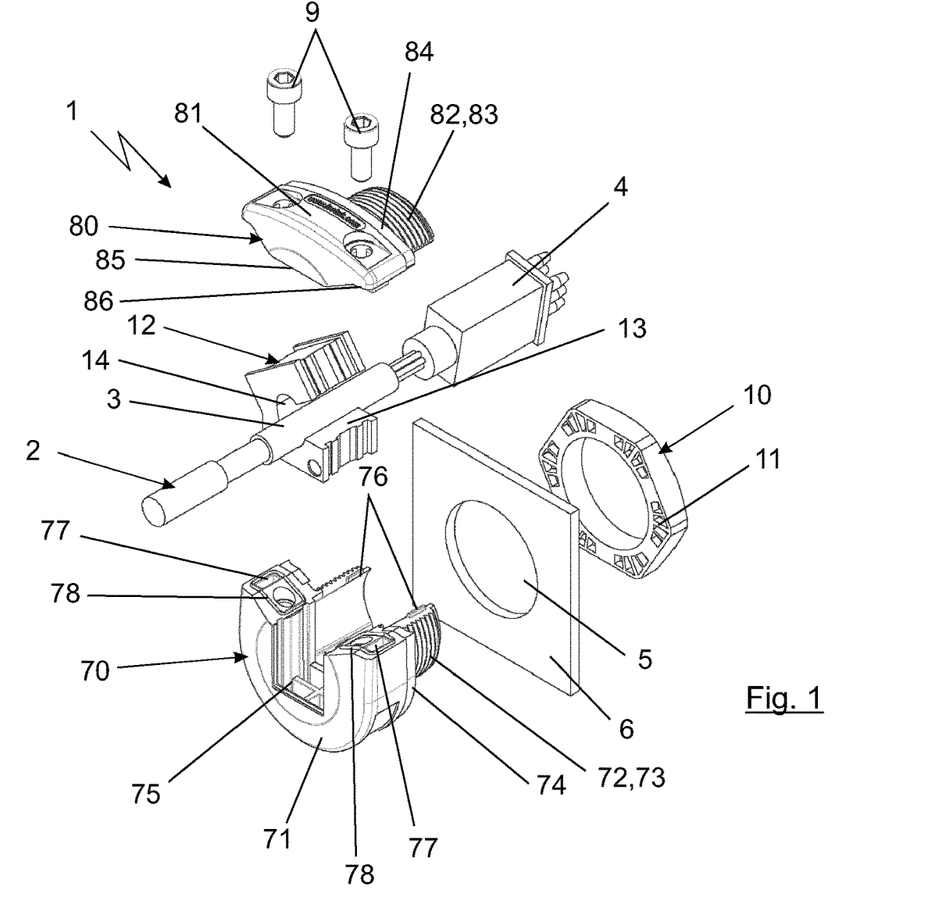
FIG. 1 shows a schematic view of a cable bushing according to the disclosure in an exploded illustration.

A cable bushing 1 can be seen in a three-dimensional exploded illustration in the illustration of FIG. 1. The cable bushing 1 is used to accommodate a prefabricated cable 2, which is illustrated here by way of example having a cable section 3 and a plug 4 attached thereon. This prefabricated cable 2 is to be guided through a passage 5 of a wall identified by 6, of which only a portion is shown here. The wall identified by 6 can be in particular the wall of a control cabinet, which is not shown in its entirety. The cable bushing 1 consists of two partial elements 70, 80, which are screwed together via two screws 9. Each of the partial elements 70, 80 comprises a receptacle section 71, 81 facing toward the observer and also a threaded section 72, 82 arranged facing away from the observer, which bears an external thread 73, 83. This threaded section 72 is guided through the passage 5 of the wall 6 and screwed together via a nut 10. The wall 6 is thus accommodated in a clamping manner between the nut 10 and the receptacle section 71, 81, which has a larger external diameter than the threaded section 72, 82. The receptacle section 71, 81 respectively comprises for this purpose a seal element 74, 84 on its side facing toward the wall 6 in the installed state, which is pressed by the tightening torque of the nut 10 against the wall 6, to seal the structure in relation to the passage 5.

The nut 10 can be produced, for example, from plastic or a fiber-reinforced plastic. It can in particular comprise framework-like sections 11, which are schematically indicated in the illustration of FIG. 1. The nut can be embodied in one piece, as shown here, since it typically has an internal diameter comparable to the passage 5 and can thus be pushed over the plug 4. In the illustration of FIG. 1, the internal thread of the nut 10 has been omitted in the illustration here. Alternatively thereto, of course, it is also conceivable to embody the nut as correspondingly divided, for example, as described and illustrated in DE 101 43 296 A1 according to the species, which is mentioned at the outset.

The receptacle section 71, 72 of the cable bushing 1 has an essentially rectangular receptacle opening 75, 85. This is formed having a square cross section in the exemplary embodiment according to FIG. 1, wherein three of the four sides are provided in one of the partial elements 70 and the fourth side is provided in the partial element 80. In this case, the receptacle opening 75, 85 laterally has a contour in which at least the surfaces extending from top to bottom in the illustration of FIG. 1 are formed profiled and make the central region in the axial direction of the receptacle opening 75, 85 narrower than in the edge regions. A strain relief bushing 12 is now laid around the cable section 3, comparably as in the prior art cited at the outset. This bushing consists of an elastic material and may be folded open along a slot 13. It comprises a round opening 14, through which the cable section 3 is guided. In particular, the opening 14 is embodied in this case having a slightly smaller diameter than the external diameter of the cable section 3, so that a close contact occurs. This close contact additionally enables a friction lock between the strain relief bushing 12 in the folded-closed state and the cable section 3, so that the functionality of the strain relief is implemented, and the cable section 3 can no longer be displaced in the installed strain relief bushing 12 under the forces acting normally on the cable 2 in the axial direction. The folded-closed strain relief bushing 12 together with the prefabricated cable 2 is now inserted into the receptacle opening 75 of the partial element 70 of the cable bushing 1. For this purpose, the strain relief bushing 12 comprises a profile corresponding to the receptacle opening 75. The dimensions are also designed here so that a friction lock occurs between the components after they have been plugged one inside the other. In this way, on the one hand, the seal required later is improved and, on the other hand, the strain relief bushing 12 having the cable 2 inserted therein is seated securely in the receptacle opening 75 of the partial element 70 and thus cannot fall out during the installation, not even if the partial element 70 is correspondingly moved, pivoted, and/or turned upside down in relation to the illustration in FIG. 1.

After the introduction of the strain relief bushing 12 having the cable 3 into the receptacle opening 75 of the larger of the two partial elements 70, the other partial element 80 is positioned accordingly. Depressions 76 in the region of the partial element 70 and also protruding guide elements 86 corresponding to the depressions 77 are used for this purpose, which can be seen better in the illustration of FIGS. 3 and 5. Further protruding guide elements 76 can also be seen in the region of the threaded section 72 to position the two partial elements 70, 80 securely and reliably in relation to one another. The corresponding depressions 87 to the guide elements 76 in the region of the threaded section 72 can be seen in the illustration of FIG. 3, a view of the partial element 80 from below.

After the completed positioning, the two partial elements 70, 80 are screwed together with one another via the screws 9. To achieve a good seal in this case, further seal elements 841 are arranged in the region of at least one of the partial elements 70, specifically so that they ensure a seal in the region of the joint between the partial elements 70, 80. The seal elements 841 mentioned are embodied as a flat seal, which is extruded together with the seal element 84 onto the material of the partial element 80, as can be seen from below in the view of the partial element 80 in the illustration of FIG. 3. The further seal elements 841 extend over the entire width of the separation between the partial elements 70, 80, so that a reliable seal is possible. To further improve the seal, a blade-like projection can additionally be seen as a sealing edge 88 in the region of the receptacle opening 85 of the upper partial element 80 in the illustration of FIG. 3. This sealing edge 88 digs into the elastic material of the strain relief bushing 12 and thus ensures a secure seal between the strain relief bushing 12 and the partial element 80. In the illustration of FIG. 1, comparable blade-like seal edges 78 are formed as rectangles extending around the boreholes for the screws 9. These seal edges 78 in turn dig into the further seal element 841 as part of the seal 84 in the partial element 80, as can be seen in the illustration of FIG. 3, and thus also ensure a reliable seal of the screw connection, so that moisture cannot penetrate via the screw connection.

Figure 3:
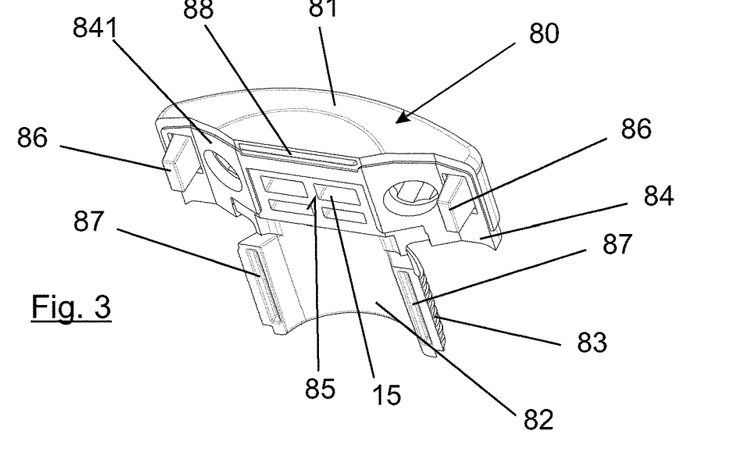
FIG. 3 shows a view of the upper partial element of the cable bushing from below.

Furthermore, it can be seen in the view according to FIG. 3 of the partial element 80 that it also comprises a type of framework 15, wherein the seal element 841 extends here between the edge 88 and the framework 15 in the region of the upper boundary of the receptacle opening 85.

The two partial elements 70, 80 are thus screwed together with one another via the screws 9. In this way, comparatively large forces may be implemented by correspondingly high tightening torques. In this way, a very good contact of the region identified with 85 of the receptacle opening 75, 85 of the one partial element 80 occurs in relation to the upper side of the strain relief bushing 12. This and the seal 841 arranged between the partial elements 70, 80 ensures that no moisture can penetrate either along the cable 3 or also between the strain relief bushing 12 and the receptacle section 71, 81 of the two partial elements 70, 80 in the installed state of the cable bushing 1. A penetration of moisture between the receptacle section 71, 81 and the wall 6 is prevented by the seal elements 74, 84. An extraordinarily leak-tight structure may thus be achieved, which can seal off one side of the wall 6, for example, the interior of the control cabinet, from the other side very well against moisture and also dirt and dust. The structure permits a protective class of IP66 and/or IP67.

Figure 2:
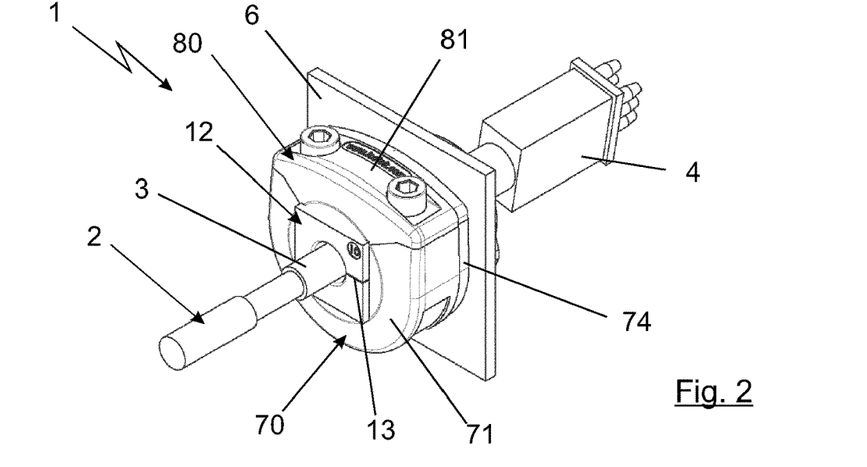
FIG. 2 shows the structure according to FIG. 1 in the installed state.
Figure 4:
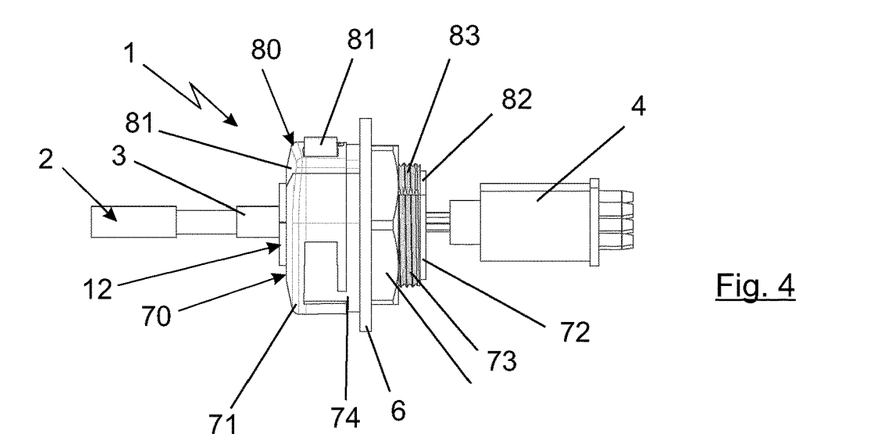
FIG. 4 shows the structure according to FIGS. 1 and 2 in a side view.

The structure can be seen once again in the installed state in the illustration of FIG. 2. FIG. 4 shows a side view in which it can be seen that the receptacle section 71, 81 is tightened against the wall 6 via the nut 10 to thus achieve a close contact on the wall 6.

To be able to implement the structure of the two partial elements 70, 80 of the cable bushing 1 as correspondingly light and nonetheless stable, they can be produced, for example, from plastic, preferably from a fiber-reinforced plastic. An injection-molding method suggests itself as the production, in which the corresponding seals 74, 84, and 78 can be extruded on subsequently to the actual injection molding. Moreover, as can be seen in the illustration of FIG. 1, a framework structure 15 can also be provided in the region of the partial element 70 and/or the partial element 80, to save material, on the one hand, and to achieve a very light and rigid structure, on the other hand.

Figure 5:
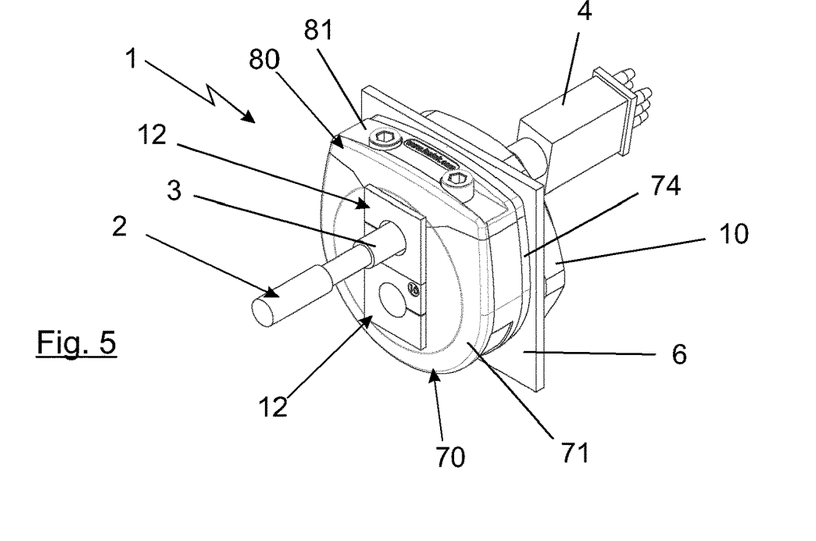
FIG. 5 shows an alternative embodiment of the cable bushing according to the disclosure in a view similar to that in FIG. 2.

An alternative embodiment of the cable bushing 1 can be seen in the illustration of FIG. 5. It is also used for feeding a prefabricated cable 2 through a wall identified by 6, for example, of a control cabinet. It only differs from the above-described cable bushing 1 in that the receptacle opening in the partial element 70 is now formed correspondingly larger, so that two strain relief bushings 12 can be accommodated. In the exemplary illustration of FIG. 5, only one of the strain relief bushings 12 is provided with a cable 2 here. The other of the strain relief bushings 12 is typically also provided with a cable 2. Otherwise, the structure is to be understood as corresponding to that in the illustration of FIGS. 1 and 2 and will not be explained in detail once again with respect to its installation.

Figure 6:
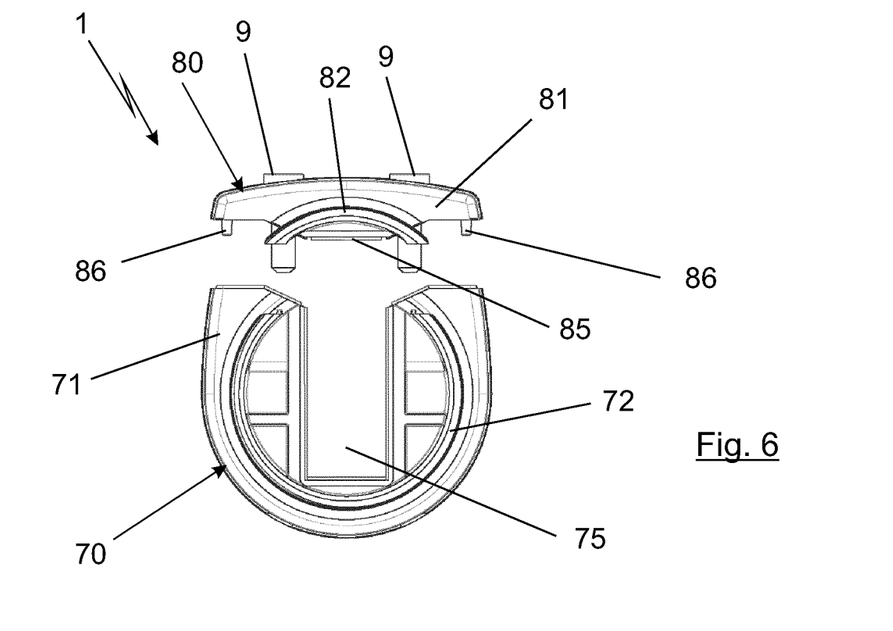
FIG. 6 shows a view of the structure according to FIG. 4 from the side of the threaded section.

A view of the cable bushing 1 according to FIG. 5 from the inner side of the wall 6, i.e., typically from the interior of the control cabinet, can be seen in the illustration of FIG. 6 in this illustration, the partial element 80 is shown raised off of the partial element 70. Strain relief bushings 12 are not inserted here. The view firstly shows the tubular threaded section 72, 82 and, following thereon in the viewing direction of the observer, the receptacle sections 81, 71. It can also be seen here again that a framework structure is inserted into the partial element 70 to accordingly make it light and efficient. In addition, it can be seen very well the illustration of FIG. 7 that one of the partial elements 80 comprises protruding guide elements 86, which then interact with the depressions 77, which are recognizable in the illustration of FIG. 1 and are comparable here, in such a manner that a rapid, reliable, and exactly-fitted plugging of the partial elements 70, 80 one onto another is possible. Subsequently, they are screwed together via the screws 9 in the above-described manner.

Figure 7:
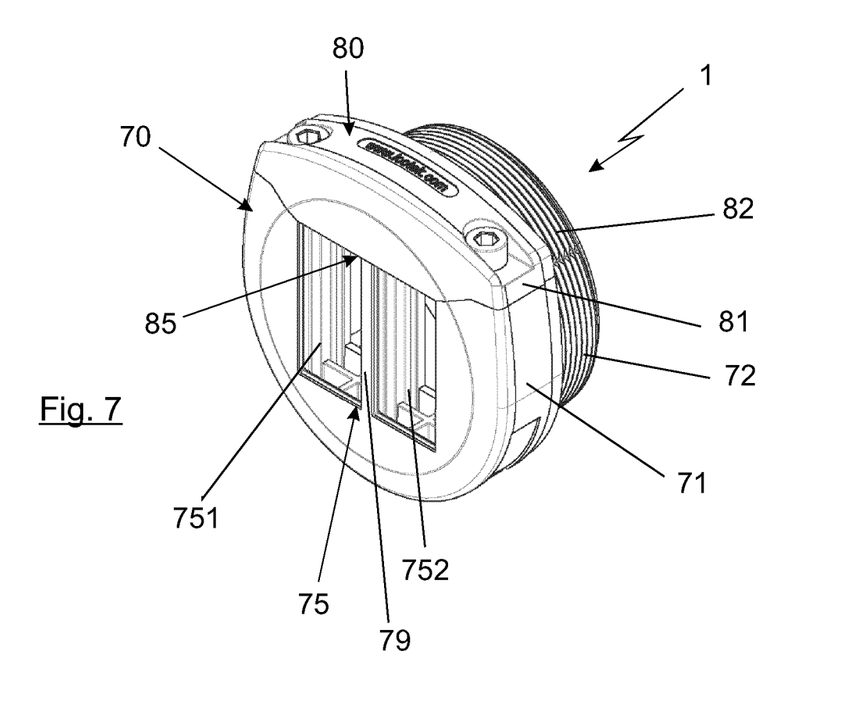
FIG. 7 shows a further embodiment of the cable bushing according to the disclosure in a view without strain relief bushings and cables.

A further embodiment variant of the cable bushing 1 according to the disclosure can be seen in the illustration of FIG. 7. The illustration approximately corresponds in his viewing angle to the illustration in FIGS. 2 and 5 and shows the cable bushing 1 in the installed state, but without the strain relief bushings 12 in contrast to the embodiment variants described therein. It can be seen that here two chambers 751, 752, which are arranged adjacent to one another, of the receptacle opening 75, 85 are shown in the larger of the partial elements 70. These chambers 751, 752, which are arranged adjacent to one another, of the receptacle opening 75, 85 permit the introduction of four strain relief bushings 12, namely two in the left chamber 751 and two in the right chamber 752, respectively. The embodiment variant of the cable bushing 1 in the illustration of FIG. 6 thus permits up to four cables 2 to be fed through.

A corresponding screw connection of the components to one another also exists here, so that a very high level of leak-tightness and in particular the protective class IP66, IP67 is to be achieved by this embodiment variant of the cable bushing 1.

Figure 8:
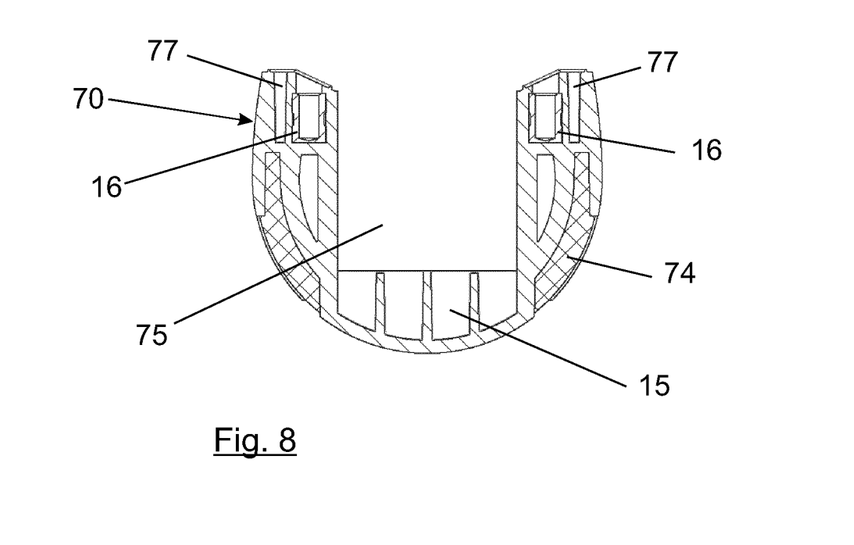
FIG. 8 shows a sectional illustration through one of the partial elements according to FIG. 7.

A sectional illustration of this embodiment variant can be seen in FIG. 8, specifically in the region in which the receptacle section 71, 81 and the threaded section 72, 82 meet one another, so that the web 79 between the two chambers 751, 752, which was visible in the illustration of FIG. 6, cannot be seen here. However, on the one hand, the framework structure 15 of the partial elements 70 which is solely shown here can be seen in greater detail in the sectional illustration. Moreover, it can be seen that metallic threaded bushes 16 are introduced into the material of the partial element 70. In principle, these can also be screwed in, in particular, however, they are to be embedded, as can be implemented in the above-described embodiment variant. Such embedded metallic threaded bushes 16 permit a reliable screw connection and the application of the desired torques to the screw connection, in order to achieve the required seal. Moreover, in contrast to a thread directly in the plastic material, they permit a multiple utilization, so that the structure can be unscrewed and screwed together again multiple times, which could result in substantial wear of the thread and a premature failure of the component in the case of a thread made of plastic.

In the sectional illustration, the material of the seal 74 can moreover be seen, which, as can also be seen in the three-dimensional views of FIGS. 2, 5, and 7, is extruded so that in addition to its integrally joined adhesion, it also achieves a formfitting adhesion with the material of the partial element 70 by it being injected into corresponding openings on the side opposite to the joint so that it remains reliably connected to the material of the partial element 70.

Figure 9:
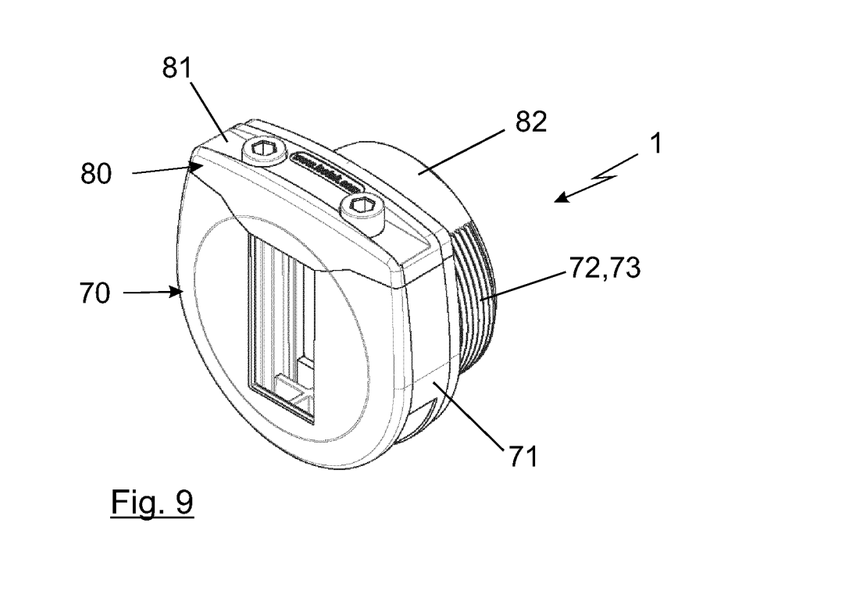
FIG. 9 shows a further alternative embodiment variant of the cable bushing according to the disclosure.

Finally, a view of the embodiment variant of the cable bushing 1 according to FIG. 5 is illustrated once again in the illustration of FIG. 9, in an illustration similar to that in FIG. 7. The difference is now that the threaded section 82 of the partial element 80 does not have threads. The threaded section 72, 82 thus only has the thread 73 in the partial element 70. The thread extends approximately over a circumference of 270°. The completing circumference of 90° by the partial element 80 does not have thread in the region of the tubular threaded section 72, 82. The thread 73 is thus implemented solely in the partial element 70. This is particularly efficient with respect to the production, since the tolerances upon the meeting of the threads with one another do not have to be taken into consideration. In this way, a simple and efficient production may be implemented. The thread 73 on the threaded section 72 of the partial element 70 is completely sufficient, if it exceeds an angle of approximately 240°, to enable a sufficient fastening of the cable bushing around the nut 10 in this case.

The off-center division of the cable bushing 1 into the two partial elements 70, 80 is now preferably performed as shown in the figure, namely in such a manner that the circumference of the receptacle opening 75, 85 is formed in the ratio of at least 2:1, preferably 3:1, between the partial elements 70, 80. In this case, preferably the respective lower edge of the receptacle opening 75 in the illustration and also the sections respectively facing upward in the illustrations of both the receptacle opening 75 and also, if provided, the two chambers 751, 752 are seated in the larger of the partial elements 70. The strain relief bushings 12 thus only have to be inserted therein and then terminate approximately level on top with the joint. In the ideal case, they protrude slightly beyond it to achieve an adequate seal later. The other partial element 80 is then screwed together with the partial element 70 via the screws 9 and the preferably embedded metallic threaded bushes 16, wherein the strain relief bushings 12 are pressed further in the direction of the partial elements 70 because of their intrinsic elasticity to thus achieve a corresponding seal. They then terminate level with the joint in the installed state. This installation, in which one of the partial elements encases three surfaces of the strain relief bushings 12 and in which the other of the partial elements 80 only touches one of the lateral surfaces of the strain relief bushings 12, permits an extraordinarily efficient seal. This permits substantially higher levels of leak-tightness than if the joint comes together in one of the surfaces of the strain relief bushings 12, as is the case in the structures according to the prior art.

As can be seen in the illustrations of the figures, in this case the outer shape of the receptacle section 71, 81 of the installed cable bushing 1 is formed approximately round. This shape is thus routine and typical in many cable bushings 1, so that the structure described here also implements this shape and/or implements it accordingly in the scope of the possibilities to thus be able to at least substantially offer the desired appearance to the observer. A deviation was only made somewhat from the circular shape for design reasons in the region of the embedded threaded bushes 12 and the screws 9 to be able to implement the screw connection and thus the higher level of leak-tightness of the structure. Nonetheless, the structure remains very compact per se and does not have lateral elements protruding far beyond the structure, as would be unavoidable, for example, in the case of a screw connection of a center division with a round external shape.

The invention claimed is:

1. A cable bushing to be screwed together with a wall comprising a passage for at least one prefabricated cable, comprising two partial elements, which are detachably connected to one another in the installed state, and which are disconnected from one another at a division in a disconnected state, a threaded section, which is formed by at least one of the two partial elements and comprises a thread, to be fed through the passage, a receptacle section, which adjoins the threaded section in an axial direction of a rotational axis thereof, and which has a larger external diameter than the threaded section over at least a part of the rotational axis of the threaded section and which comprises at least one receptacle opening for accommodating at least one strain relief bushing, with the two partial elements maintaining the disconnected state, the strain relief bushing positionable into the at least one receptacle opening in an insertion direction transverse to a longitudinal axis of the cable bushing, a fastener insertable into the partial elements along a fastener direction transverse to the longitudinal axis of the cable bushing to hold the two partial elements in the installed state, wherein the division between the two partial elements is formed off-center, so that a circumference of the receptacle opening extending around the at least one strain relief bushing is greater in one of the partial elements than in the other of the partial elements.

2. The cable bushing according to claim 1, wherein the fastener comprises a screw.

3. The cable bushing according to claim 2, wherein a plurality of threaded bushes made of a metallic material are positioned in the receptacle section of the larger of the two partial elements.

4. The cable bushing according to claim 3, wherein the plurality of threaded bushes are extrusion coated by the material of the partial element.

5. The cable bushing according to claim 2, wherein the circumference of the receptacle opening extending around the at least one strain relief bushing is greater in one of the partial elements than in the other of the partial elements in a ratio of at least 2:1.

6. The cable bushing according to claim 2, wherein a first one of the two partial elements extends through a first arc about the rotational axis of the threaded section of 60° and a second one of the two partial elements extends through a second arc about the rotational axis of the threaded section of 300°.

7. The cable bushing according to claim 2, wherein the thread of the threaded section does not extend over the entire circumference of the threaded section.

8. The cable bushing according to claim 2, wherein a height of the at least one receptacle opening around the at least one strain relief bushing in one of the partial elements in the installed state is equal to a height of the at least one strain relief bushing or equal to an integral multiple of the height of the at least one strain relief bushing.

9. The cable bushing according to claim 1, wherein the circumference of the receptacle opening extending around the at least one strain relief bushing is greater in one of the partial elements than in the other of the partial elements in a ratio of at least 2:1.

10. The cable bushing according to claim 9, wherein a first one of the two partial elements extends through a first arc about the rotational axis of the threaded section of 120° and a second one of the two partial elements extends through a second arc about the rotational axis of the threaded section of 240°.

11. The cable bushing according to claim 9, wherein the thread of the threaded section does not extend over the entire circumference of the threaded section.

12. The cable bushing according to claim 1, wherein a first one of the two partial elements extends through a first arc about the rotational axis of the threaded section of 90° and a second one of the two partial elements extends through a second arc about the rotational axis of the threaded section of 270°.

13. The cable bushing according to claim 12, wherein the thread of the threaded section does not extend over the entire circumference of the threaded section.

14. The cable bushing according to claim 1, wherein the thread of the threaded section does not extend over the entire circumference of the threaded section.

15. The cable bushing according to claim 14, wherein a first one of the two partial elements comprises a smaller part in the region of the threaded section and is free of a thread.

16. The cable bushing according to claim 1, wherein a height of the at least one receptacle opening around the at least one strain relief bushing in one of the partial elements in the installed state is equal to a height of the at least one strain relief bushing or equal to an integral multiple of the height of the at least one strain relief bushing.

17. The cable bushing according to claim 1, wherein a plurality of seal elements are positioned between the two partial elements at least in the region of the receptacle section.

18. The cable bushing according to claim 17, wherein the seal elements are formed extruded on one or both of the partial elements.

19. The cable bushing according to claim 1, wherein the partial elements comprise plastic.

20. The cable bushing according to claim 1, wherein at least one of the partial elements comprises protruding guide elements in the region of the division, which engage in corresponding depressions of the respective other partial element.

* * * * *